(12) United States Patent  (10) Patent No.: US 6,168,359 B1
Smith  (45) Date of Patent: Jan. 2, 2001

(54) APPARATUS AND METHOD FOR SECURING A LOAD IN THE FLAT BED AREA OF A VEHICLE

(76) Inventor: Jeff Smith, 3203 Old 22, Hamburg, PA (US) 19526

( * ) Notice: Under 35 U.S.C. 154(b), the term of this patent shall be extended for 0 days.

(21) Appl. No.: 09/235,039

(22) Filed: Jan. 21, 1999

(51) Int. Cl.$^7$ ...................................................... B60P 7/08
(52) U.S. Cl. ............................... 410/38; 410/32; 410/34; 410/143; 410/151
(58) Field of Search .................................. 410/34, 32, 35, 410/38, 129, 151, 150, 143; 248/231.1, 316.1, 500; 224/403, 536, 323, 42.38, 558, 570; 206/452

(56) References Cited

U.S. PATENT DOCUMENTS

| | | | |
|---|---|---|---|
| 7,575 | * | 8/1850 | Drake ........................................ 410/32 |
| 673,273 | * | 4/1901 | Langlotz et al. ..................... 410/38 X |
| 710,639 | * | 10/1902 | Vickers ................................... 410/38 |
| 1,644,279 | * | 10/1927 | Romine ................................... 410/35 |
| 1,940,186 | * | 12/1933 | Romine ................................... 410/38 |
| 2,855,217 | * | 10/1958 | Bagwell ................................. 410/32 |
| 3,446,515 | * | 5/1969 | Julian, Jr. .............................. 410/38 |
| 4,121,849 | * | 10/1978 | Christopher ..................... 410/150 X |
| 4,737,056 | * | 4/1988 | Hunt ..................................... 410/151 |
| 5,433,566 | * | 7/1995 | Bradley ............................... 410/121 |
| 5,509,764 | * | 4/1996 | Shives ................................. 410/150 |
| 5,971,685 | * | 10/1999 | Owens .................................. 410/151 |

* cited by examiner

*Primary Examiner*—Stephen T. Gordon

(57) ABSTRACT

The present invention is a device for securing a load on the flat bed of a truck having sidewalls or other vehicle having a like cargo area. One exemplary embodiment of the present invention comprises a base member having rods extending substantially vertically therefrom. Adjustable side connectors are coupled to the base member at one or both sides of the base member in order to secure the base member to the side walls of the flat bed. A slide bar is adjustably displaced along the length of the rods to adapt to loads of varying height. The slide bar serves to secure and to stabilize the load. A fastener directs the slide bar against the load and toward the base member. Thus, the slide bar acts in a clamp-like manner to secure a load within the flat bed area of a vehicle. The present invention further comprises extension elements which enable the side connectors to be engaged to the sidewalls of the flat bed at varying heights depending on the construction of the vehicle. A lower end of each extension element is secured to the end of the base member and the side connectors couple with an upper end of the extension element at one or more locations so that the base member may engage the sidewalls of the flat bed at varying heights. In another exemplary embodiment of the present invention, a system is disclosed including a double base member and slide bar arrangement which form a dual clamp assembly. This system is implemented by placing a pair base member/slide bar assemblies on the flat bed of a truck at a given distance apart to accommodate for the length of a load. The double assembly acts to secure both ends of a load, such as lumber. When used in this manner, the invention prevents a load from shifting while the vehicle is in motion.

11 Claims, 4 Drawing Sheets

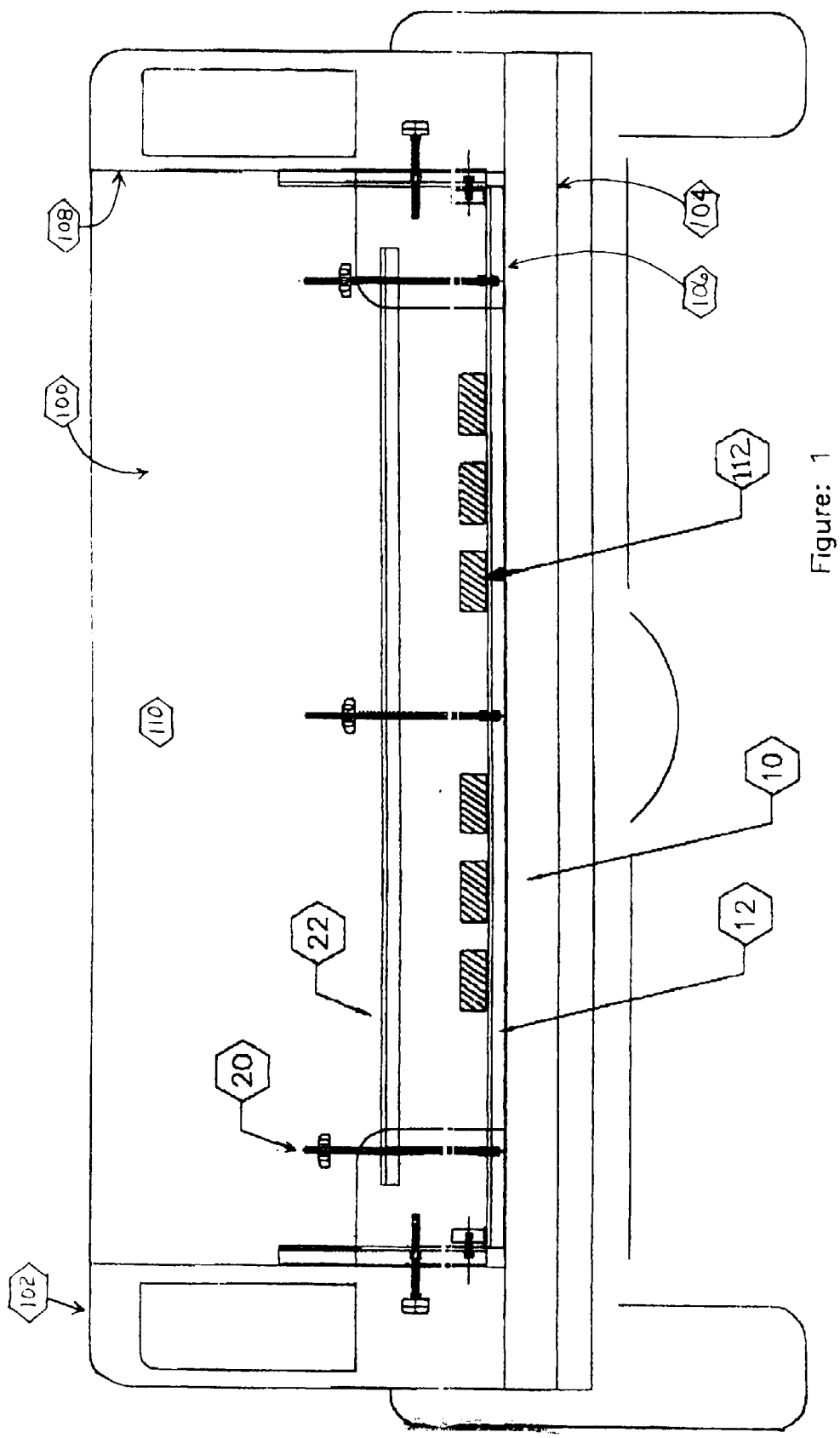
Figure: 1

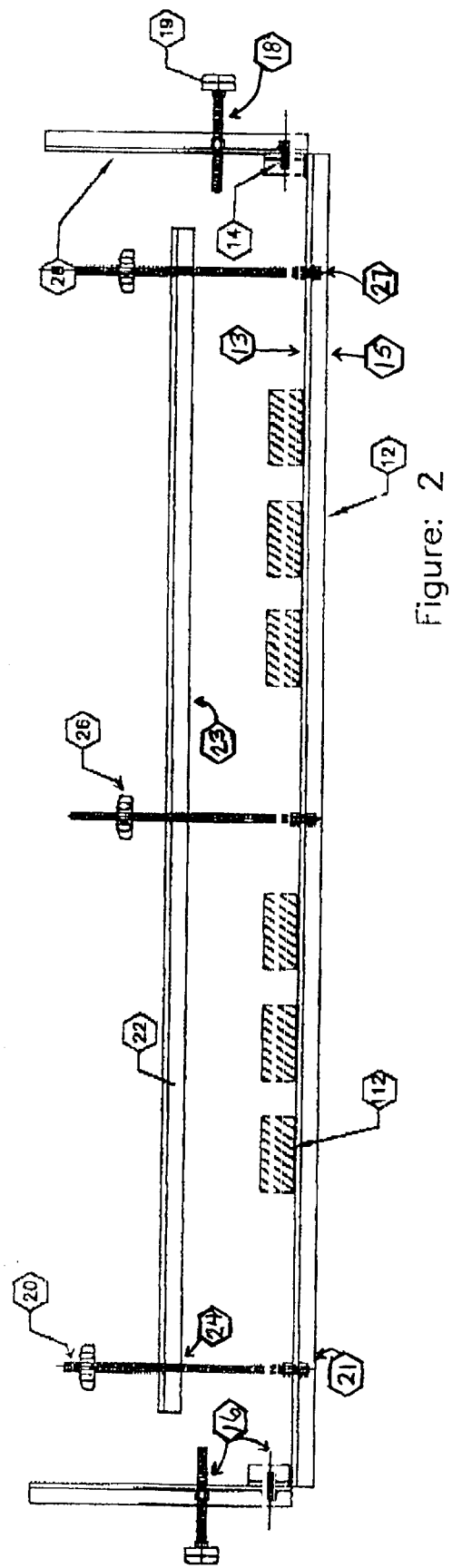
Figure: 2

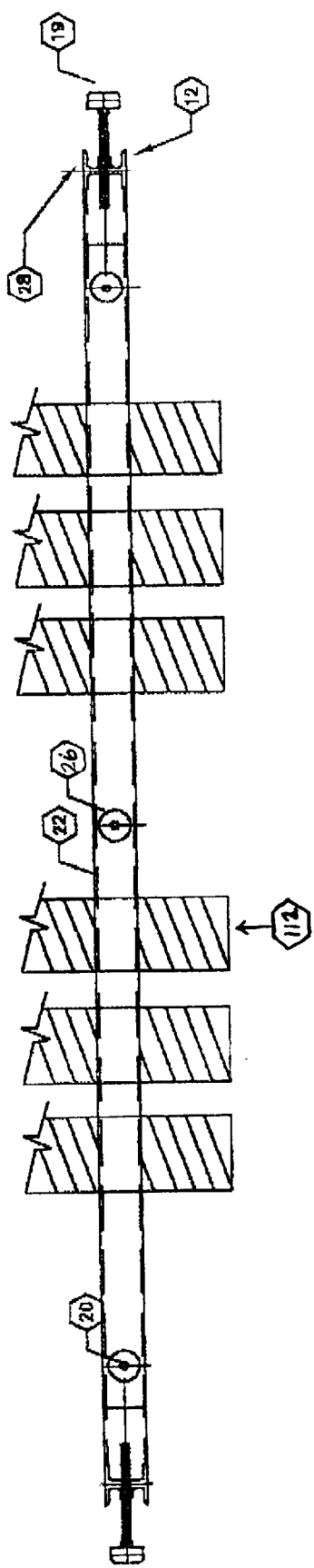
Figure: 3

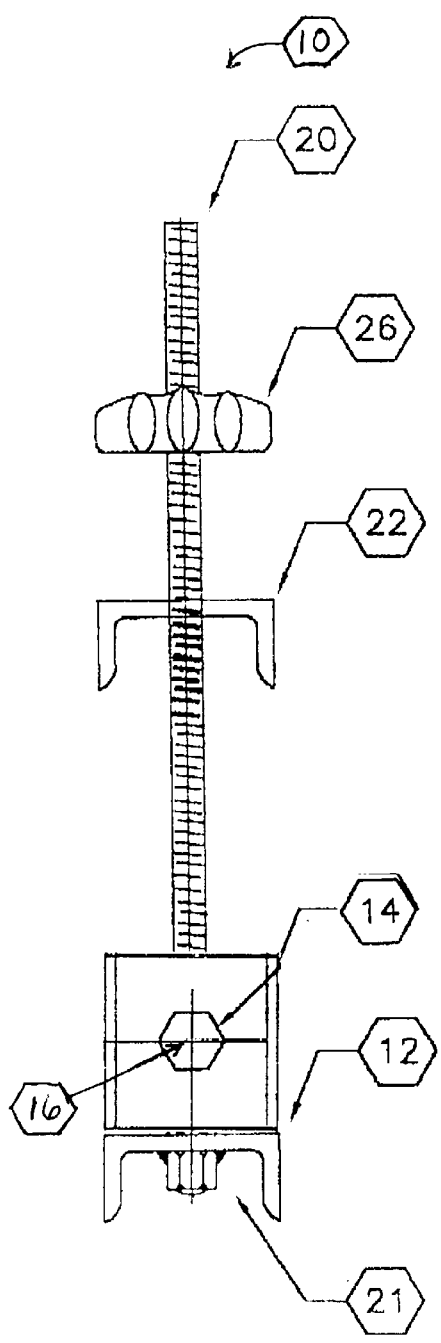
Figure: 4
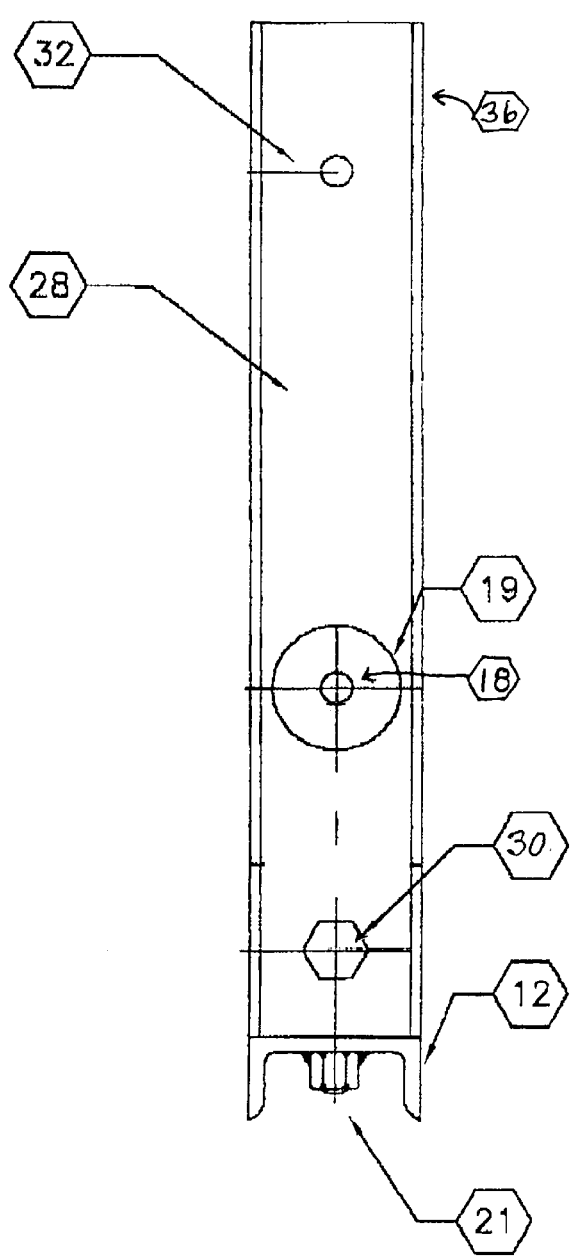
Figure: 5

APPARATUS AND METHOD FOR SECURING A LOAD IN THE FLAT BED AREA OF A VEHICLE

FIELD OF THE INVENTION

The present invention relates generally to devices for stabilizing a load on the flat bed of a vehicle, and more particularly, to devices for securing loads of lumber on the flat bed of a pick-up truck or similar vehicle.

BACKGROUND OF THE INVENTION

Many vehicles are designed to provide for the transport of cargo loads. One example of such a vehicle is a pick-up truck which utilizes a flat bed located behind the cab area of the vehicle for the transport of cargo. This cargo area or flat bed is large enough to accommodate many different types of loads, for example, lumber. In many instances, however, a load of lumber will extend beyond the length of the flat bed area, such that the tailgate cannot be closed when carrying the load. In other words a lumber load often times will extend beyond the length of the flat bed so as to rest and sometimes overhang an open (or closed) tailgate.

Other than anchor points for tying down a load, most truck beds do not readily accommodate a manner in which to secure or fasten a load of material that is placed in and may sometimes extend beyond the length of the bed. Therefore, any cargo placed on the flat bed can extend beyond the length and have a tendency to shift or slide around while the vehicle is in motion, for example, during stops and starts. Such activity, even if the cargo does not extend beyond the bed, can result in damage to the load, as well as the loss of portions of the load which may fall off of the truck bed while the vehicle is in transit. Such activity is not only costly, with respect to damage to the cargo, but can also creates a dangerous situation for other drivers that can ultimately result in serious injury.

Accordingly, there is a need to provide a simple and cost effective methodology to enable the safe transport of specialized cargo loads, such as, lumber, in the flat bed area of a vehicle.

SUMMARY OF THE INVENTION

The present invention is a device for securing a load on the flat bed of a truck having sidewalls or other vehicle having a like cargo area. One exemplary embodiment of the present invention comprises a base member having rods extending substantially vertically therefrom. Adjustable side connectors are coupled to the base member at one or both sides of the base member in order to secure the base member to the side walls of the flat bed. A slide bar is adjustably displaced along the length of the rods to adapt to loads of varying height. The slide bar serves to secure and to stabilize the load. A fastener directs the slide bar against the load and toward the base member. Thus, the slide bar acts in a clamp-like manner to secure a load within the flat bed area of a vehicle.

The present invention further comprises extension elements which enable the side connectors to be engaged to the sidewalls of the flat bed at varying heights depending on the construction of the vehicle. A lower end of each extension element is secured to the end of the base member and the side connectors couple with an upper end of the extension element at one or more locations so that the base member may engage the sidewalls of the flat bed at varying heights.

In another exemplary embodiment of the present invention, a system is disclosed including a double base member and slide bar arrangement which form a dual clamp assembly. This system is implemented by placing a pair of base member/slide bar assemblies on the flat bed of a truck at a given distance apart to accommodate for the length of a load. The double assembly acts to secure both ends of a load, such as lumber. When used in this manner, the invention prevents a load from shifting while the vehicle is in motion.

BRIEF DESCRIPTION OF THE DRAWINGS

For a better understanding of the present invention, reference is made to the following description of an exemplary embodiment thereof, considered in conjunction with the accompanying drawings, in which:

FIG. 1 shows one exemplary embodiment of a load securing apparatus in accordance with the present invention as situated in the flat bed of a pick-up truck;

FIG. 2 shows a front view of the load securing apparatus in accordance with the present invention;

FIG. 3 is a top plan view of the present invention apparatus;

FIG. 4 is a side view of the present invention apparatus; and

FIG. 5 is a front view of an exemplary extension element in accordance with the present invention.

DETAILED DESCRIPTION

Although the present invention apparatus and method can be used in any number of vehicles having a flat bed cargo area with side members, it is particularly useful in its employment within the flat bed area of a pick up truck. Accordingly, by way of example, the present invention device and method will be described within the context of use for a pickup truck.

The present invention is an apparatus and method for securing a load in the flat bed area of a vehicle. Referring to FIG. 1, there is shown an exemplary embodiment of a load securing apparatus 10 according to the present invention as utilized in the flat bed area 100 of a vehicle 102 to secure a load of lumber. Referring to FIGS. 2, 3 and 4 in combination with FIG. 1, it can be seen that the present invention apparatus is comprised of two main sections, a base member 12 and a slide bar 22. As shown, the base member 12 and slide bar 22 are coupled together via connector rods 20. As illustrated in FIG. 1, the base member is located toward the rear of the flat bed area 100 of the vehicle 102 proximate the tailgate 104, but within the confines of the flat bed region. The base member 12 as shown is an elongated rigid member having a substantially flat top surface 13. As shown, the base member 12 also includes a substantially flat bottom surface 15 such that the base member will lay flat atop the bed or bed liner 106 of the flat bed of the vehicle 100. Suitable materials for the base member may include most any rigid material that is not overly susceptible to deformation such as hard metals, plastics or wood. The height H and width W of the base member are also selected so that the base member will rest atop the flat bed without tipping. The length L of the base member is selected in accordance with the width of the of the flat bed 100 and/or side wall 108 of the vehicle. The base member 12 also includes first and second end pieces 14 which may either be fastened to the outermost ends of the base member 12 (as shown) or be integral with the base member. The end pieces 14 are adapted to receive adjustable end connectors 18. In one exemplary embodiment of the invention, the end pieces are made of a machined metal having at least one threaded aperture 16 therein for accepting a threaded adjustable end connector.

As would be understood to a person skilled in the art, once the base member is placed across the width of the flat bed, the end connectors 18 may be adjusted outward so as to engage the sidewall 108 of the vehicle and securely fasten the apparatus 10 within the flat bed area 100. The end connectors may include a rubberized head 19 or be equipped with padding in order to minimize any damage to the sidewalls of the vehicle when engaged. The base member 12 further includes at least two additional rod apertures 27 proximate each end piece 14 which extend through the top and bottom surfaces 13, 15 of the base member 12, although other apertures may also be located along the length of the base member. The rod aperture 27 are sized to accept one end of a vertical clamping rod 20. In one embodiment of the present invention, the clamping rods 20 are threaded having a flat base 21 at one end. The rods extends through the rod apertures 27 and are held in place by the rod base 21 which is of a greater diameter than the rod apertures and which acts to prevent the end of the clamping rod 20 having the base 21 from extending into the base member 12 and the corresponding aperture 27. Alternatively, the vertical rods 20 may also be threaded into the base member 12. If more than two clamping rods 20 are utilized for the present invention (for example, when additional clamping force is need as with warped or boards of uneven thickness), it advantageous that the centrally located clamping rods be slightly shorter (e.g., one inch) than he outermost rods thereby making it easier to secure a corresponding clamping or slide bar.

The apparatus 10 further includes a slide bar 22 having corresponding rod apertures 24 which are intended to align with the rod apertures 27 of the base member 12. As with the base member, the slide bar 22 is also an elongated rigid member having a substantially flat bottom surface 23. In an exemplary embodiment of the present invention apparatus 10, the height H' and width W' dimensions of the slide bar 22 and the base member 12 are substantially similar so as to be able to create approximately equal opposing forces in their ability to hold a load. The slide bar 22 may also be constructed of similar materials to that of the base member 12. As can be seen, the length L' of the slide bar is somewhat shorter than that of the base member 12. Ideally, the length of the slide bar 22 is just somewhat less than the tightest width dimension of the sidewalls of the vehicle, although depending on the application it may be substantially shorter. Once the base member is secured within the flatbed area 100 to the sidewall 108 of the vehicle, the slide bar 22 is aligned with the base member 12 so that the clamping rods 20 may extend through the rod apertures 24 thereof.

As would be understood, in order to secure a load 112 utilizing the present invention apparatus, the load 112 is preferably buttressed against the back wall 110 of the flat bed 100. The opposing end of the load will rest atop the top surface 13 of the base member 12. Once the desired load has been input to the flat bed of the vehicle, the slide bar 22 is aligned with the base member 12 so that the respective apertures also align. The slide bar 22 is then slid over the clamping rods 20 so that the bottom surface of slide bar 23 makes contact with the upper most surface for the load 112. Handle nuts 26 are then threaded onto the clamping rods 20 and tightened so that the slide bar 22 clamps securely onto the top of the load 112. In other words, the load is clamped between the top surface 13 of the base member 12 and the bottom surface 23 of the slide bar 22. Since the base member 12 is securely fastened to the side wall 108 of the vehicle 102 so as to prevent motion during transit, the lumber load will also be secured within the flat bed area 100 of the vehicle once the handle nuts 26 are securely fastened.

In another embodiment of the present invention two or more of the present invention apparatus assemblies 10 are utilized in tandem within a single flat bed area in order to further secure the load. (See FIG. 1.) In a similar manner to the operation of the present invention previously described, at least a second apparatus 10' would be located in a region somewhere between the middle of the flat bed area 100 and the back portion of the flat bed. The second assembly 10' is operated in a similar manner to that of the first, where the second assembly adds additional stability from shifts in the load which are encountered during transport.

Referring to FIG. 5, the present invention further includes extension elements 28 which enable the side connectors 18 to be engaged to the sidewalls of the flat bed at varying heights depending on the construction of the vehicle. A lower end 34 of each extension element 28 is secured to the end piece 14 of the base member 12 via fasteners such as nuts and bolts or screws, wherein corresponding apertures 30 would be included in both the extension member 28 and the end piece 14. Alternatively, the inside of the extension elements 28 would be sized so as to slide over and engage with the end piece 14 in a force fit. The side connectors 18 couple with an upper end 36 of the extension element at one or more locations, for example at apertures 32, so that the base member may engage the sidewalls of the flat bed at varying heights.

From the above, it should be understood that the embodiments described, in regard to the drawings, are merely exemplary and that a person skilled in the art may make variations and modifications to the shown embodiments without departing from the spirit and scope of the invention. For example any number of end connectors and clamping rods may be utilized and other known clamping arrangements may also be utilized. All such variations and modifications are intended to be included within the scope of the invention as defined in the appended claims.

What is claimed is:

1. An apparatus for securing various sized loads, in a vehicle having a flat bed, said flat bed having first and second side walls and a bottom surface, comprising:

at least one base member for supporting a load, said base member having first and second ends;

at least first and second rods vertically extending from a first and second section of said base member;

at least first and second adjustable connectors for attaching said base member to said first and second side walls;

at least one slide bar, defining first and second holes, wherein said slide bar is vertically displaced along the length of said first and second rods to adapt to the size of said load; and a fastener mechanism for clamping said slide bar and said load against said base member.

2. An apparatus as defined by claim 1, further including:

an additional base member for supporting a load, said additional base member having first and second ends;

an additional pair of rods, one of said additional rods vertically attached to a first section of said additional base member and the remaining additional rod vertically attached to a second section of said additional base member;

an additional pair of adjustable connectors for attaching said additional base member to said first and second side walls;

an additional slide bar, defining first and second holes, wherein said additional slide bar is vertically displaced along the length of said pair of additional rods to adapt to the size of said load; and an additional fastener mechanism for clamping said additional slide bar and said load against said additional base member.

3. An apparatus as defined by claim 1, wherein each of said first and second adjustable connectors further comprises:
   a threaded shaft, said threaded shaft fitted to threaded holes located on said first and second ends of said base member; and
   a flat head, said flat head attached to said threaded shaft, wherein each of said adjustable connectors is twisted through one of said threaded holes, forcing said flat head to contact with a respective said side wall of said flat bed securely fastening said base member to said flat bed.

4. An apparatus as defined by claim 1, wherein said fastener mechanism comprises at least first and second nuts, said first and second nuts fitted with said first and second rods, wherein said first and second nuts are twisted on corresponding ones of said first and second rods, forcing said slide bar against said load, stabilizing said load against said base member.

5. An apparatus as defined by claim 1 further comprising adjustable means for varying vertical engagement of said adjustable connectors to said side walls of said flat bed.

6. An apparatus as defined by claim 5, wherein said adjustable means further comprises a pair of extension pieces, each extension piece having a lower end and an upper end, said upper end defining at least one upper aperture, wherein said lower end of ones of said extension pieces is coupled to said first end of said base member, and said lower end of the remaining extension piece is coupled to said second end of said base member, and corresponding ones of said adjustable connectors are twisted through respective ones of said upper apertures of a corresponding one of said extension pieces causing said base member to engage a respective said side wall of said flat bed at vertically varying positions.

7. An apparatus as defined by claim 6, wherein said adjustable means further comprises a pair of bolts, said lower end of each said extension piece defining a lower aperture fitted with said bolts, wherein a respective one of said bolts couples a corresponding one of said lower ends of said base member to an extension piece.

8. An apparatus as defined by claim 6, wherein said lower end of each extension piece fits with, and slidably engages an end of said base member in a force fit arrangement.

9. An apparatus as defined by claim 3, wherein said flat head of said adjustable connector includes a pliable cover to prevent damage to said sidewalls of said vehicle.

10. An apparatus for securing various sized loads, in a vehicle having a flat bed, said flat bed having first and second side walls and a bottom surface, comprising:
   at least a base member for supporting a load, said base member having first and second ends;
   at least first and second rods vertically attached to a first and second section of said base member;
   at least first and second adjustable connectors, each of said first and second adjustable connectors including a threaded shaft fitted to respective threaded holes located on said first and second ends and a flat head attached to said threaded shaft, wherein said first adjustable connector is twisted through said threaded hole in said first end and said second adjustable connector is twisted through said threaded hole in said second end, forcing said flat head to contact with a respective said side wall of said truck bed, securely fastening said base member to said flat bed;
   at least a slide bar, defining first and second holes, wherein said slide bar is vertically displaced along the length of said first and second rods to adapt to the size of said load;
   at least first and second nuts, said first and second nuts fitted with said first and second rods, wherein said first nut is twisted on said first rod, and said second nut is twisted on said second rod, forcing said slide bar against said load, stabilizing said load against said base member;
   at least a pair of extension pieces, each extension piece having a lower end and an upper end, said lower end defining a lower aperture, and said upper end defining an upper aperture;
   at least a pair of bolts, each bolt fitted with a respective said lower aperture, wherein one of said bolts couples said first end to one of said extension pieces and a remaining one of said bolts couples said second end to a remaining one of said extension pieces and said first and second adjustable connectors are twisted through corresponding ones of said upper apertures connecting said base member to said side walls at varying vertical positions.

11. A system for securing various sized loads, in a vehicle having a flat bed, said flat bed having first and second side walls and a bottom surface, comprising:
   at least first and second base members for supporting a load, each of said first and second base members having first and second ends;
   at least four rods, a first pair of said rods vertically coupled to a first and second section of said first base member and a second pair of said rods vertically coupled to a first and second section of said second base member;
   at least four adjustable connectors, each adjustable connector having a threaded shaft fitted to respective threaded holes located on said first and second ends of each said base member, and a flat head attached to said threaded shaft, wherein each adjustable connector is twisted through a corresponding one of said threaded holes, forcing said flat head to contact with a respective said side wall of said flat bed, securely fastening a respective said base member to said flat bed;
   at least a pair of slide bars, each slide bar defining first and second holes, wherein one of said slide bars is vertically displaced along the length of said first pair of rods, and a second said slide bar is vertically displaced along the length of said second pair of rods, to adapt to the size of said load and stabilize said load on said respective base member;
   at least four nuts, each nut fitted with said rods, wherein said nuts are twisted on corresponding said rods forcing said slide bars against said load, stabilizing said load against said first and second base members;
   at least four extension pieces, each extension piece having a lower end and an upper end, said lower end defining a lower aperture, and said upper end defining an upper threaded aperture;
   at least four bolts, each bolt fitted a respective one of said pair of apertures, a pair of said bolts coupling said first and second end of said first base member to a pair of said extension pieces and a second pair of said bolts coupling said first and second ends of said second base member to a second pair of extension pieces, wherein said adjustable connectors are twisted through said upper apertures connecting said base member to said side walls at varying vertical positions.

* * * * *